UNITED STATES PATENT OFFICE.

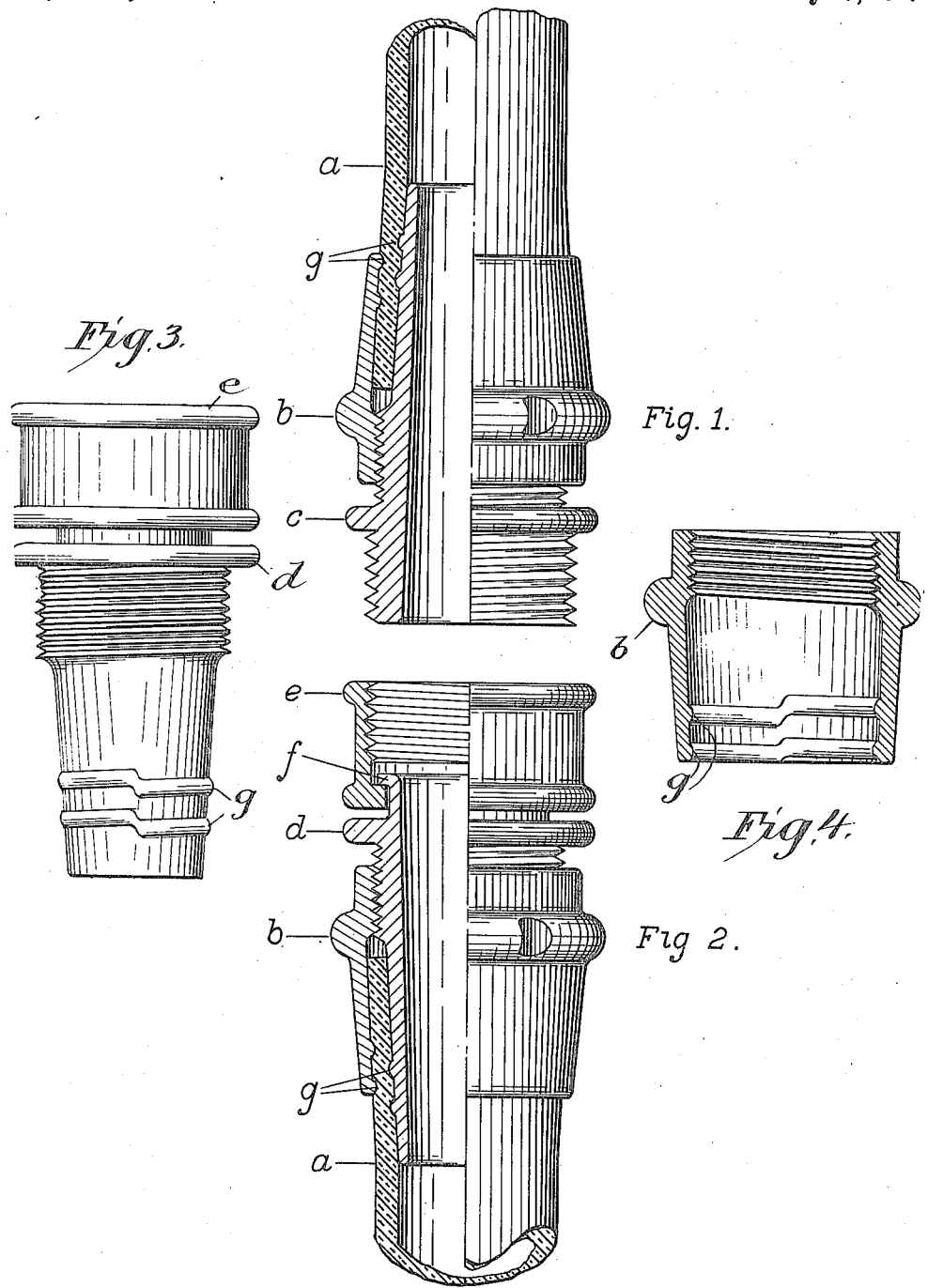

JOHN H. REEVE, OF SHERMAN, CALIFORNIA.

HOSE-COUPLING.

1,233,401. Specification of Letters Patent. Patented July 17, 1917.

Application filed January 19, 1916. Serial No. 73,052.

*To all whom it may concern:*

Be it known that I, JOHN H. REEVE, a citizen of the United States, residing at Sherman, in the county of Los Angeles and State of California, have invented a new and useful Hose-Coupling, of which the following is a specification.

My invention relates to improvements in hose couplings which are used in conjunction with rubber, or fibrous hose; and the objects of my invention are, first, to provide a coupling that can be attached to any such hose in a very convenient manner; second, to afford facilities for the proper adjustment of the coupling to hose of varying thicknesses, and varying internal and external diameters; and, third, to secure the coupling to the hose in such a way that leakage will be most effectively prevented.

I attain these objects by the device illustrated in the accompanying drawings, in which—

Figure 1 is a view of the male portion of the coupling attached to the hose, and shown half in section; Fig. 2 is a view of the female portion of the coupling, also attached to the hose and shown half in section; Fig. 3 is an elevation of a portion of the coupling with the outer sleeve $b$, and the hose $a$, removed therefrom; and Fig. 4 is a sectional elevation of the outer sleeve $b$.

Similar letters refer to similar parts throughout the several views. The hose is shown at $a$. The outer sleeves $b$, are the same for both male and female ends. The inside sleeve $c$, is used for the male coupling, and the inside sleeve $d$, is used for the female coupling. The inside sleeve $d$, carries, mounted upon it, the swivel nut $e$, by means of which the male and female portions of the coupling are united. This swivel nut $e$, is held in place by the flange $f$, on the upper portion of the inside female sleeve $d$. This flange is formed in the process of manufacture during the assembly of the female coupling unit, either by means of a suitable punch and die operation, or by means of uniting a flanged part to the other portion of sleeve $d$, by means of soldering or brazing.

At $g$ there is shown in section two rounded, shallow, threads upon the inside of the outer sleeves $b$, and also upon the outside of the inner sleeves $c$ and $d$. None of these threads are continuous, and each consists of not more than one complete turn. The pitch of these threads may therefore be the same as that of the threads connecting the inner and outer sleeves, and their purpose is, to obtain a more effective grip upon the hose, and also to assist in the prevention of leakage. Since the pitch of the non-continuous threads $g$ may be the same as that of the threads connecting the inner and outer sleeves, they may be made to oppose no resistance except friction to the tightening of the coupling upon the hose. Moreover, on account of the lack of continuity of these threads, there is no complete path for the possible escape of fluid along their course.

In applying the coupling, the outside sleeve $b$ is first slipped onto the hose $a$. The inside sleeve, $c$ or $d$ according to whether a male or female coupling is desired, is then inserted into the hose and turned to the right to bring the threads $g$ into play. In this manner the inside sleeve may be worked far into the hose, and become very tight within it, due to its conical form. When the inner sleeve has been inserted in this manner as far as possible, the outer sleeve $b$ is brought up, and the two screwed tightly together. Screwing up the outer sleeve has the effect of bringing its interior conical surface into closer proximity to the exterior conical surface of the inner sleeve, and thus compresses the material of the hose tightly between these two surfaces.

It is evident that this method of attaching the coupling to the hose, allows of moderate variations in the thickness, as well as variations in the inside and outside diameters of the hose, without diminishing the effectiveness of the device. It is also apparent that since the fabric of the hose is very firmly gripped and compressed between the inner and outer sleeves, there will be no opportunity for leakage at the point of application of the coupling to the hose, as has been the case with devices where the pressure and surface are insufficient for this purpose.

I am aware that prior to my invention hose couplings have been made in which the principle of compressing the material of the hose against an inner sleeve has been utilized. I am also aware that conical surfaces carrying screw-threads have been used on the inner and outer sleeves of hose couplings. I therefore do not claim such a combination broadly; but

I claim:

1. In a hose coupling, the combination of an inner sleeve having an exterior conical shaped surface adapted to enter the end of a hose; an outer sleeve having an interior conical shaped surface adapted to compress the end of the hose against the conical surface of the inner sleeve; a screw threaded connection between said inner and outer sleeves that is concentric with the axis of the coupling, whereby said conical surfaces may be made to approach each other; and screw threads upon each of said conical surfaces which have the same pitch as the threaded connection between the inner and outer sleeves, and which are not continuous for more than one complete turn.

2. In a hose coupling, the combination of an inner and an outer sleeve having exterior and interior conical shaped surfaces respectively, and engaging each other by means of screw threads that are concentric with the axes of said sleeves and adapted to allow of axial motion of said conical surfaces with respect to each other; and screw threads upon each of said conical surfaces that are adapted for engaging the material of the hose, said last mentioned threads having the same pitch as that of the threads composing the connection between said sleeves, and being continuous for not more than one complete turn.

3. In a hose coupling, the combination of an outer sleeve having an interior conical shaped surface, and adapted for screwing onto a concentric inner sleeve, having an exterior conical shaped surface, in such a manner that the said conical shaped surfaces may be made to approach each other and compress the material of the hose between them; and screw threads, having the same pitch as that of the threads composing the connection between said sleeves, upon both of said conical shaped surfaces for engaging the material of the hose, and being continuous for not more than one complete turn.

JOHN H. REEVE.

Witnesses:
ARTHUR J. FARNSWORTH,
HERMAN R. JOHNSON.